US008698946B2

United States Patent
Ward

(10) Patent No.: US 8,698,946 B2
(45) Date of Patent: Apr. 15, 2014

(54) MULTIPLE EXPOSURE METHODS AND APPARATUS FOR ELECTRONIC CAMERAS

(75) Inventor: Gregory John Ward, Albany, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 13/022,632

(22) Filed: Feb. 8, 2011

(65) Prior Publication Data
US 2011/0122289 A1    May 26, 2011

Related U.S. Application Data

(63) Continuation of application No. 12/614,851, filed on Nov. 9, 2009, now Pat. No. 7,889,273, which is a continuation of application No. 11/459,633, filed on Jul. 24, 2006, now Pat. No. 7,616,256, which is a continuation-in-part of application No. 11/236,155, filed on Sep. 26, 2005, now abandoned.

(60) Provisional application No. 60/663,245, filed on Mar. 21, 2005.

(51) Int. Cl.
*H04N 5/235* (2006.01)
*H04N 3/14* (2006.01)

(52) U.S. Cl.
USPC ........ 348/362; 348/221.1; 348/296; 348/302; 348/311

(58) Field of Classification Search
CPC ......... H04N 5/235; H04N 5/228; H04N 3/14; H04N 9/64
USPC .............. 348/221.1, 248, 250, 249, 296, 297, 348/298, 282, 302, 305, 311, 303, 317–323, 348/222.1, 221.2, 362–366
See application file for complete search history.

(56) References Cited

U.S. PATENT DOCUMENTS

| | | | |
|---|---|---|---|
| 4,652,909 A | 3/1987 | Glenn | |
| 5,828,793 A * | 10/1998 | Mann | ............................. 382/284 |
| 6,198,505 B1 | 3/2001 | Turner et al. | |
| 6,204,881 B1 | 3/2001 | Ikeda et al. | |
| 6,480,226 B1 | 11/2002 | Takahashi et al. | |
| 6,542,698 B2 | 4/2003 | Izawa | |
| 6,587,149 B1 | 7/2003 | Yoneyama et al. | |
| 6,618,090 B1 | 9/2003 | Kidono et al. | |
| 6,784,935 B1 | 8/2004 | Uya et al. | |

(Continued)

OTHER PUBLICATIONS

Ward, Greg, "HDR is as Easy as 1-2-3", SIGGRAPH 2004 Conference, Los Angeles Convention Center, Los Angeles, California, Aug. 8-12, 2004.

(Continued)

*Primary Examiner* — Tuan Ho
*Assistant Examiner* — Marly Camargo

(57) ABSTRACT

A method for capturing multiple sets of image data with an electronic camera having a shutter and an electronic shutter for selectively allowing light to reach an image sensor comprises opening the shutter and the electronic shutter, allowing light to reach the image sensor for a first exposure time, closing the electronic shutter, reading out pixel data captured during the first exposure time, allowing light to reach the image sensor for a second exposure time, and, reading out pixel data captured during the second exposure time. The method may be used to obtain multiple differently exposed images of a scene for combination into a high dynamic range image.

14 Claims, 7 Drawing Sheets

(56) References Cited

U.S. PATENT DOCUMENTS

| | | | |
|---|---|---|---|
| 6,788,338 B1 | 9/2004 | Dinev et al. | |
| 6,831,695 B1 * | 12/2004 | Tamayama | 348/362 |
| 6,903,770 B1 | 6/2005 | Kobayashi et al. | |
| 6,930,716 B2 | 8/2005 | Yoshida | |
| 6,965,410 B1 * | 11/2005 | Yamagishi | 348/362 |
| 6,975,355 B1 * | 12/2005 | Yang et al. | 348/308 |
| 7,289,155 B2 | 10/2007 | Kidono et al. | |
| 7,409,104 B2 * | 8/2008 | Vitsnudel et al. | 382/284 |
| 7,423,681 B2 | 9/2008 | Summa et al. | |
| 7,460,168 B2 | 12/2008 | Horiuchi | |
| 7,508,436 B2 | 3/2009 | Parks | |
| 7,557,858 B2 | 7/2009 | Honda et al. | |
| 7,616,256 B2 | 11/2009 | Ward et al. | |
| 2002/0097997 A1 | 7/2002 | Izawa | |
| 2002/0141002 A1 * | 10/2002 | Takano et al. | 358/513 |
| 2002/0186313 A1 * | 12/2002 | Kidono et al. | 348/362 |
| 2004/0165091 A1 | 8/2004 | Takemura et al. | |
| 2005/0275747 A1 | 12/2005 | Nayar et al. | |
| 2006/0158462 A1 | 7/2006 | Toyama et al. | |
| 2006/0209204 A1 | 9/2006 | Ward | |
| 2007/0257184 A1 | 11/2007 | Olsen et al. | |
| 2010/0013983 A1 | 1/2010 | Ward et al. | |
| 2010/0231771 A1 | 9/2010 | Yaghmai | |
| 2011/0242368 A1 * | 10/2011 | Haneda et al. | 348/239 |

OTHER PUBLICATIONS

Debevec, Paul E. et al., "Recovering High Dynamic Range Radiance Maps from Photographs", Proceedings of SIGGRAPH 97, Computer Graphics Proceedings, Annual Conference Series, Addison Wesley, Edited by Turner Whiffed (Los Angeles, California), pp. 369-378 (Aug. 1997).

Mann, S. et al., "On Being Undigital With Digital Cameras: Extending Dynamic Range by Combining Differently Exposed Pictures", in Proc. IS&T 46th Annual Conference, pp. 422-428 (May 1995).

* cited by examiner

MULTIPLE EXPOSURE METHODS AND APPARATUS FOR ELECTRONIC CAMERAS

CROSS REFERENCE TO RELATED APPLICATIONS

This application is a continuation of U.S. patent application Ser. No. 12/614,851 filed 9 Nov. 2009, which is a continuation of U.S. patent application Ser. No. 11/459,633 filed on 24 Jul. 2006 and issued as U.S. Pat. No. 7,616,256 on 10 Nov. 2009, which is a continuation-in-part of U.S. patent application Ser. No. 11/236,155 filed on 26 Sep. 2005, which claims the benefit under 35 U.S.C. §119 of U.S. patent application No. 60/663,245 filed on 21 Mar. 2005, all of which are entitled MULTIPLE EXPOSURE METHODS AND APPARATUS FOR ELECTRONIC CAMERAS and are hereby incorporated herein by reference.

TECHNICAL FIELD

The invention relates to electronic cameras, and particularly to methods and electronic camera apparatus for capturing multiple exposures. The invention has application in capturing high dynamic range images.

BACKGROUND

Real world scenes can have contrast ratios of 50,000:1 between the brightness of the brightest highlights and the darkest shadows. Many conventional image formats and image rendering devices (such as digital projectors, computer monitors, and the like) are only capable of reproducing contrast ratios of a few hundred to one. In such file formats it is not uncommon for pixel brightness values to be specified using one 8-bit number per colour.

High dynamic range ("HDR") image formats permit recording contrast ratios that are significantly greater than those of conventional 8-bit image formats. For example, some HDR formats use 16 or 32 bits per colour to represent different levels of brightness.

One way to obtain image data for high dynamic range images is to acquire multiple images with conventional imaging equipment at different exposure levels. This technique is described, for example, in Debevec et al. *Recovering High Dynamic Range Radiance Maps from Photographs*, Proceedings of SIGGRAPH 97, Computer Graphics Proceedings, Annual Conference Series, pp. 369-378 (August 1997, Los Angeles, Calif.), Addison Wesley, Edited by Turner Whitted. ISBN 0-89791-896-7, which is hereby incorporated herein by reference.

A problem is that the multiple images need to be aligned with one another. This makes it necessary to use a tripod in most cases. Further, setting a camera to take multiple images appropriate for combination into an HDR image requires significant knowledge regarding the appropriate combination of exposures to use for each of the images.

HDR images are becoming mainstream. There is a need for methods and apparatus for easily acquiring HDR images.

SUMMARY OF THE INVENTION

This invention provides methods and apparatus for acquiring multiple exposures in electronic cameras. The methods and apparatus may be applied to acquiring images that can be combined to yield an HDR image. Methods according to some embodiments of the invention can be practiced with standard electronic camera hardware controlled by a controller executing modified firmware.

One aspect of the invention provides a method of capturing images with an electronic camera having a shutter and an electronic shutter for selectively allowing light to reach an image sensor. The method comprises opening the shutter and the electronic shutter, allowing light to reach the image sensor for a first exposure period, closing the electronic shutter, reading out pixel data captured during the first exposure period, allowing light to reach the image sensor for a second exposure period, closing the shutter, and, reading out pixel data captured during the second exposure period either before or after closing the shutter. The pixel data is preferably read out after the shutter is closed. The pixel data for the first exposure period may be retained in a pixel store of the image sensor and the pixel data for the second exposure period may be retained in pixels of the sensor until after the shutter has closed. The method may be implemented by firmware in a controller of an electronic camera.

Another aspect of the invention provides an electronic camera having a shutter, an electronic shutter, an array of light sensors and a controller configured to cause the electronic camera to acquire multiple images by: opening the shutter and the electronic shutter; allowing light to reach the image sensor for a first exposure period; closing the electronic shutter; reading out pixel data captured during the first exposure period; allowing light to reach the image sensor for a second exposure period; closing the shutter; and, reading out pixel data captured during the second exposure period either before or after closing the shutter. The shutter is held open for both the first and second exposure periods. The pixel data is preferably read out after the shutter is closed. The pixel data for the first exposure period may be retained in a pixel store of the image sensor and the pixel data for the second exposure period may be retained in pixels of the sensor until after the shutter has been closed by the controller.

Another aspect of the invention comprises an EPROM or other computer-readable medium carrying firmware instructions for execution by a controller of an electronic camera. The instructions, when executed by the controller cause the controller to perform a method according to the invention.

Another aspect of the invention provides a method of capturing an image with an electronic camera having a shutter for selectively allowing light to reach an image sensor and means for selectively reading out pixel data from the image sensor. The method comprises opening the shutter, allowing light to reach the image sensor for a first exposure period, preserving a first portion of pixel data captured during the first exposure period, allowing light to reach the image sensor for a second exposure period, and, reading out the first portion of pixel data captured during the first exposure period and pixel data captured during the second exposure period.

Other aspects of the invention and features of specific embodiments are described below.

BRIEF DESCRIPTION OF DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

One aspect of the invention allows an electronic camera to be configured to capture multiple exposures of a single image. The multiple exposures may be used to create a high dynamic range (HDR) image. Methods for combining data from multiple exposures to yield a HDR image are known in the art. For example, some such methods are described in Mann, S. et al. *Being 'undigital' with digital cameras: Extending dynamic range by combining differently exposed pictures*, In Proc. IS&T 46th Annual Conference (May, 1995) pp. 422-428 which is hereby incorporated herein by reference and in the Debevec et al. article referred to above.

Electronic cameras typically have a shutter which can be opened to selectively allow light to reach a light sensitive chip or closed to block light from reaching the chip. When the shutter is open, a lens projects an image onto the chip. The shutter may comprise a mechanical shutter, for example.

The chip measures light intensity at a number of pixel locations. Values representing the intensity at each of the pixels can be read out and stored in a memory. Light sensitive chips also typically include means for selecting the amount of time the light sensitive elements collect light before the data stored therein is read out. Such means can act as an "electronic shutter". For example, many CCD chips include a control that triggers reading out of pixel data from light-sensitive pixels into vertical data registers that are shielded from light. The inventor has determined that during a single period while the mechanical shutter is held open, the electronic shutter may be operated to achieve multiple exposures of a single image.

Figure 1:
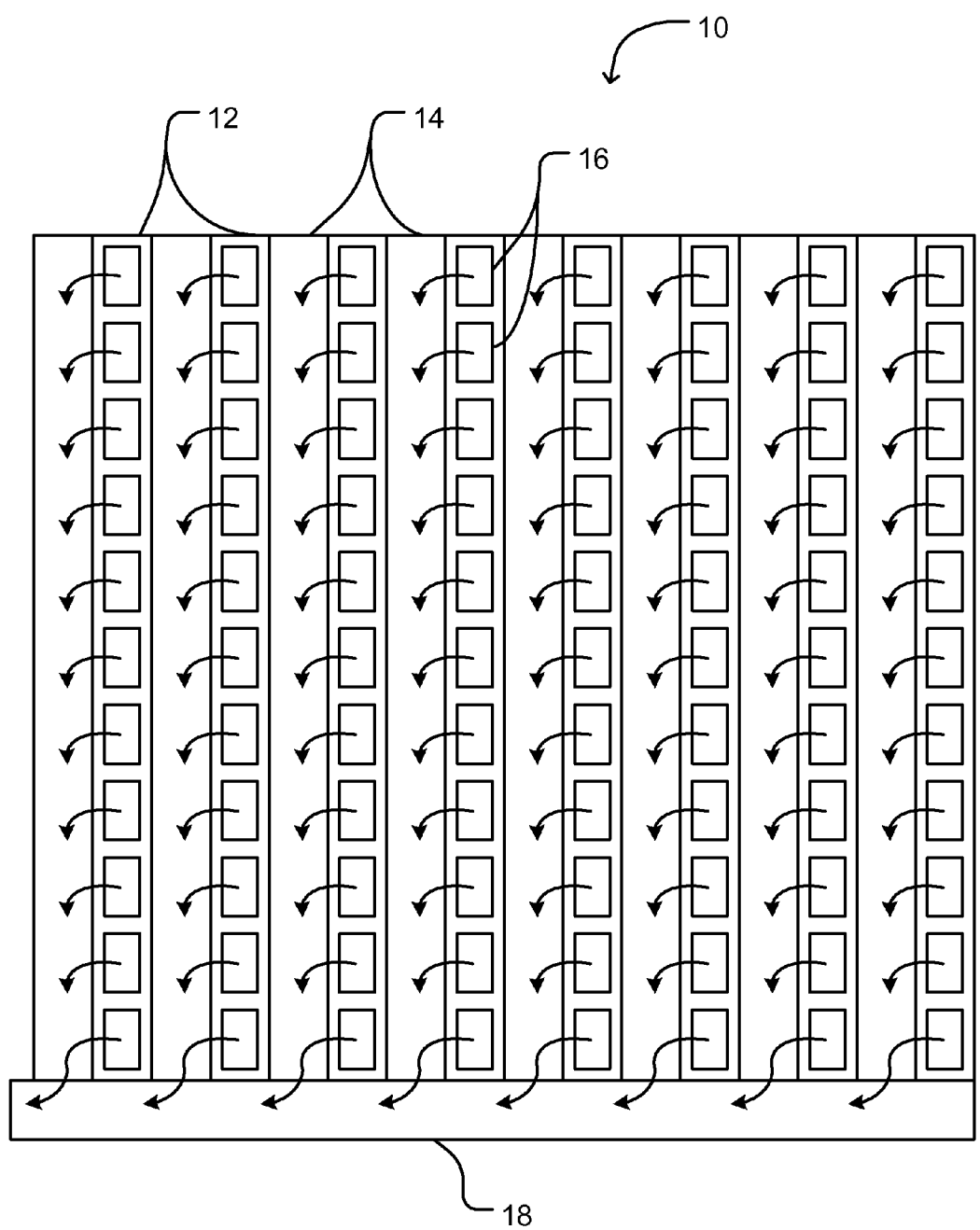
FIG. 1 shows a sensor layout for an interline transfer CCD.

FIG. 1 shows a sensor layout for an interline transfer charge coupled device ("CCD") 10 of the type used in many electronic cameras. CCD 10 comprises a plurality of imaging regions 12 which comprise light sensitive elements, and storage regions which comprise vertical registers 14. In the illustrated embodiment, imaging regions 12 alternate with vertical registers 14 in a horizontal direction. Imaging regions 12 each comprise a plurality of pixels 16. Each pixel 16 comprises a sensor that stores charge. The amount of stored charge depends upon the number of photons detected by the sensor. As indicated by the arrows in FIG. 1, after an image is exposed, pixel data characterizing the charges stored in pixels 16 are shifted to vertical registers 14.

Vertical registers 14 (which are sometimes referred to as "column registers") may be covered with an opaque mask layer (e.g. with strips of aluminum) to prevent incoming light from striking vertical registers 14. Vertical registers 14 preserve the charges' characteristics as the pixel data is shifted down vertical registers 14 into a horizontal register 18. (The terms "vertical", "horizontal" and "down" used in this description refer to the orientation of the elements shown in the Figures, rather than to any particular physical orientation.) The pixel data is generally read out from horizontal register 18 to an analog-to-digital converter through one or more amplifiers and/or other signal conditioning circuits (not shown).

Figure 2:
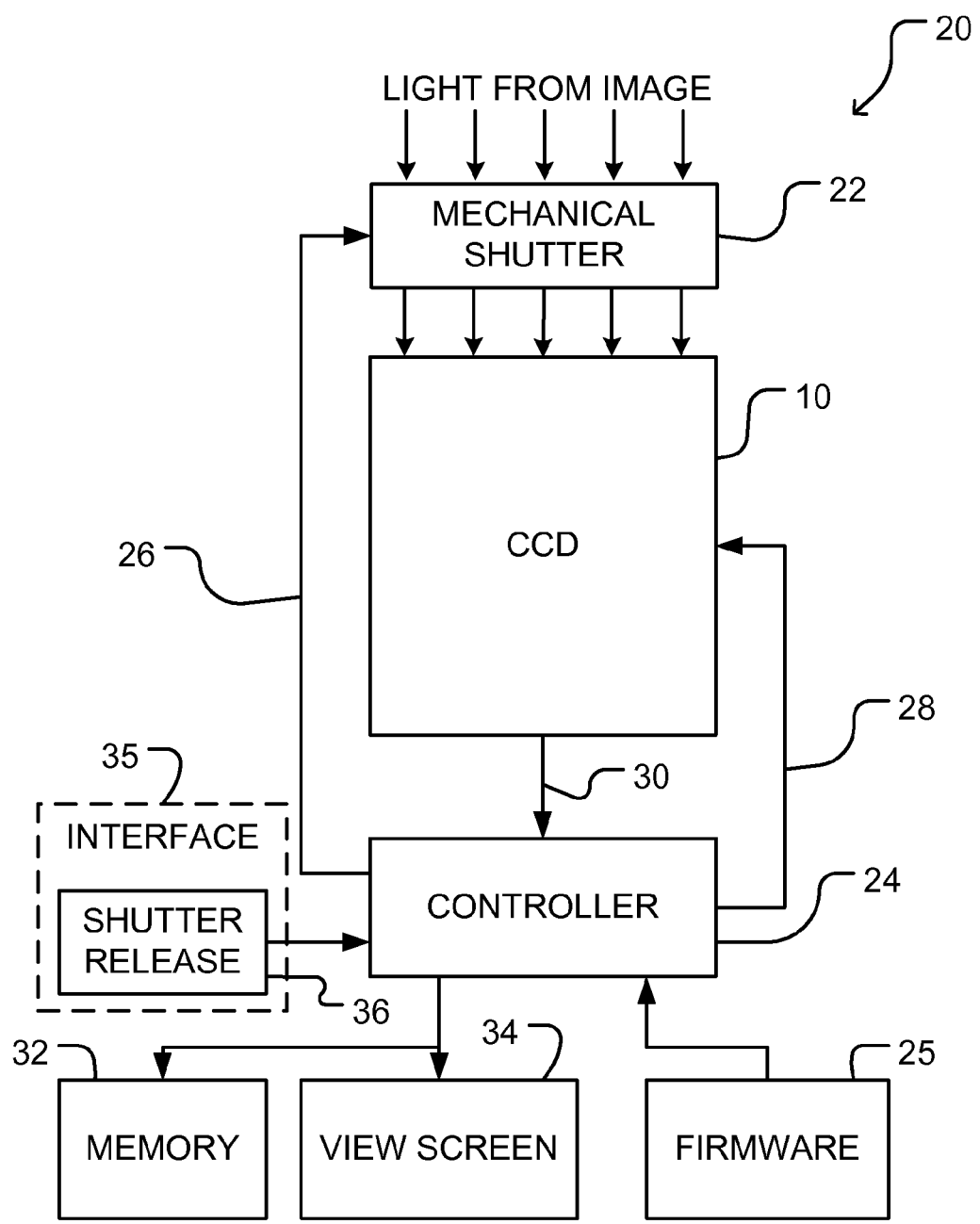
FIG. 2 is a block diagram of an electronic camera.

FIG. 2 shows an electronic camera 20 equipped with CCD 10 of FIG. 1. Camera 20 comprises a mechanical shutter 22 for selectively allowing light from an image to reach CCD 10. When mechanical shutter 22 is open, the incoming light is focused by a lens (not shown) onto CCD 10. A controller 24 controls the opening and closing of shutter 22 by means of a shutter control line 26. Controller 24 also controls the clocking of vertical registers 14 and horizontal register 18 of CCD 10 by means of a CCD control line 28. Controller 24 may comprise, for example, a microprocessor running software (e.g. firmware 25).

Controller 24 receives pixel data from CCD 10 by means of data line 30. Controller 24 may store the pixel data in a memory 32, display an image based on the pixel data on a view screen 34, or both. Camera 20 also comprises an interface 35 for allowing a user to interact with controller 24. Interface 35 includes a shutter release 36. Shutter release 36 may be triggered by a timer, an electronic signal, a shutter release button or the like.

Figure 3:
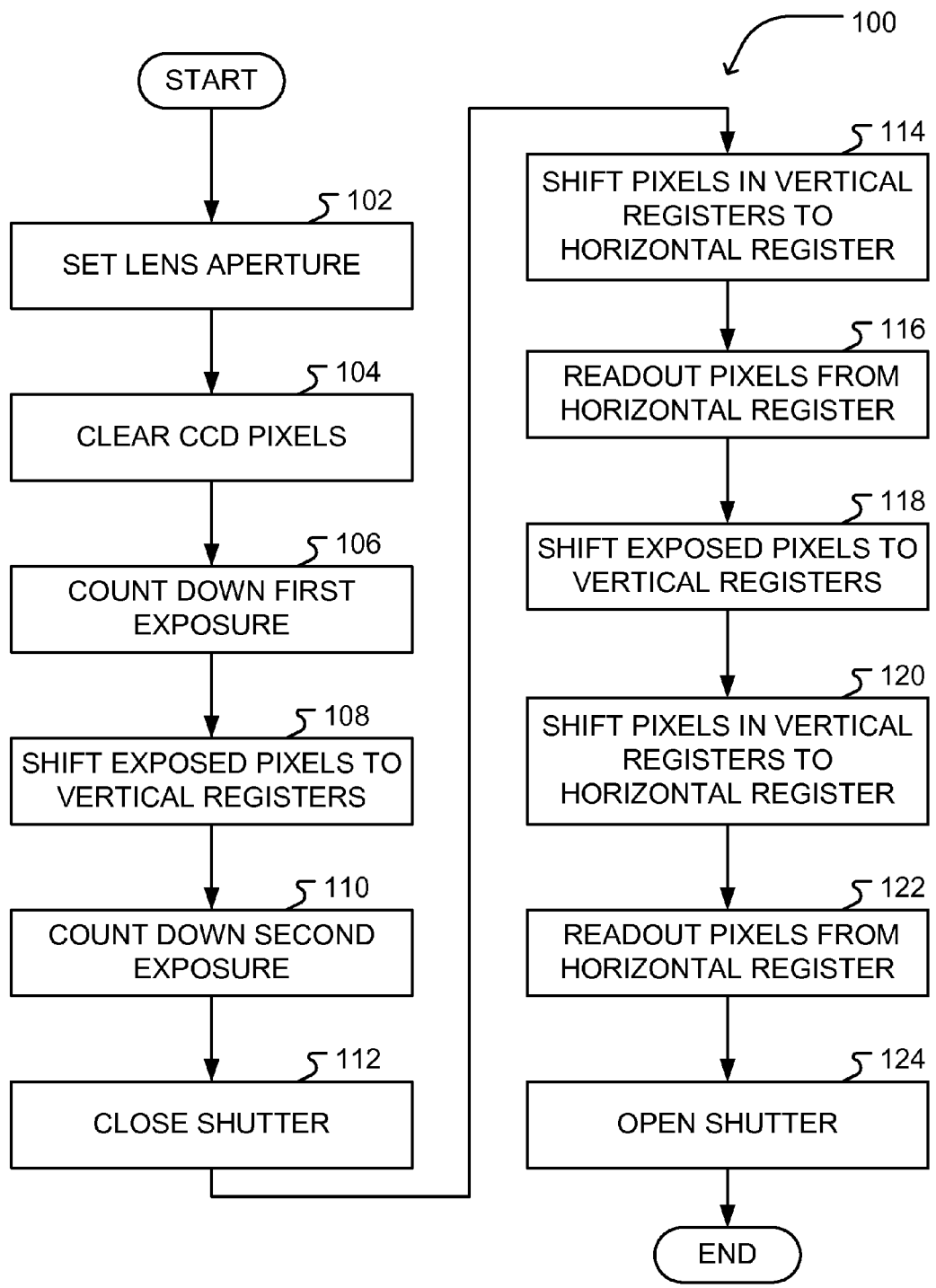
FIG. 3 is a flowchart illustrating the steps in a method according to one embodiment of the invention.

FIG. 3 shows a method 100 for capturing multiple exposures of a single image using CCD 10 of FIG. 1. The mechanical shutter is open at the start of method 100. In block 102, method 100 sets the camera's lens to an appropriate aperture. The aperture may be set by the camera's exposure control circuit. A wide variety of suitable systems for setting the shutter aperture in digital cameras are known in the art. Such systems may set the aperture to a user-determined value or may set the aperture according to an algorithm based upon detected light levels.

At block 104 any charge stored in pixels 16 is cleared, and a first exposure begins. At block 106 the camera's exposure timer counts down a predetermined time period for the first exposure. After the predetermined time period for the first exposure has elapsed, the charge stored in pixels 16 is shifted into vertical registers 14 at block 108.

Shifting of the charge from pixels 16 to vertical registers 14 at block 108 simultaneously ends the first exposure and begins a second exposure. At block 110 the camera's exposure timer counts down a predetermined time period for the second exposure. After the predetermined time period for the second exposure has elapsed, the mechanical shutter is closed at block 112, thereby ending the second exposure.

At block 114, pixel data from the first exposure (i.e. the charge from pixels 16 which was shifted into vertical registers 14 at block 108) is shifted down vertical registers 14 to horizontal register 18. At block 116 the pixel data from the first exposure is read out from horizontal register 18.

At block 118, the charge stored in pixels 16 from the second exposure is shifted into vertical registers 14. At block 120, pixel data from the second exposure is shifted down vertical registers 14 to horizontal register 18. At block 122 the pixel data from the second exposure is read out from horizontal register 18. At block 124 method 100 ends. In or after block 124, the mechanical shutter may be opened again to ready the camera for capturing the next image.

The exposures for the first and second exposures are different. This may be achieved by making the time period for the first exposure different from the time period for the second exposure. The predetermined time period for the first exposure is preferably longer than the predetermined time period for the second exposure. For example, the first exposure may last for ⅛ second and the second exposure may last for ¹⁄₁₂₅th second. The first and second exposure times may depend on minimum and maximum brightnesses of the image being captured and other factors such as the aperture setting. The aperture setting may be changed between the first and second exposures.

Figure 4:
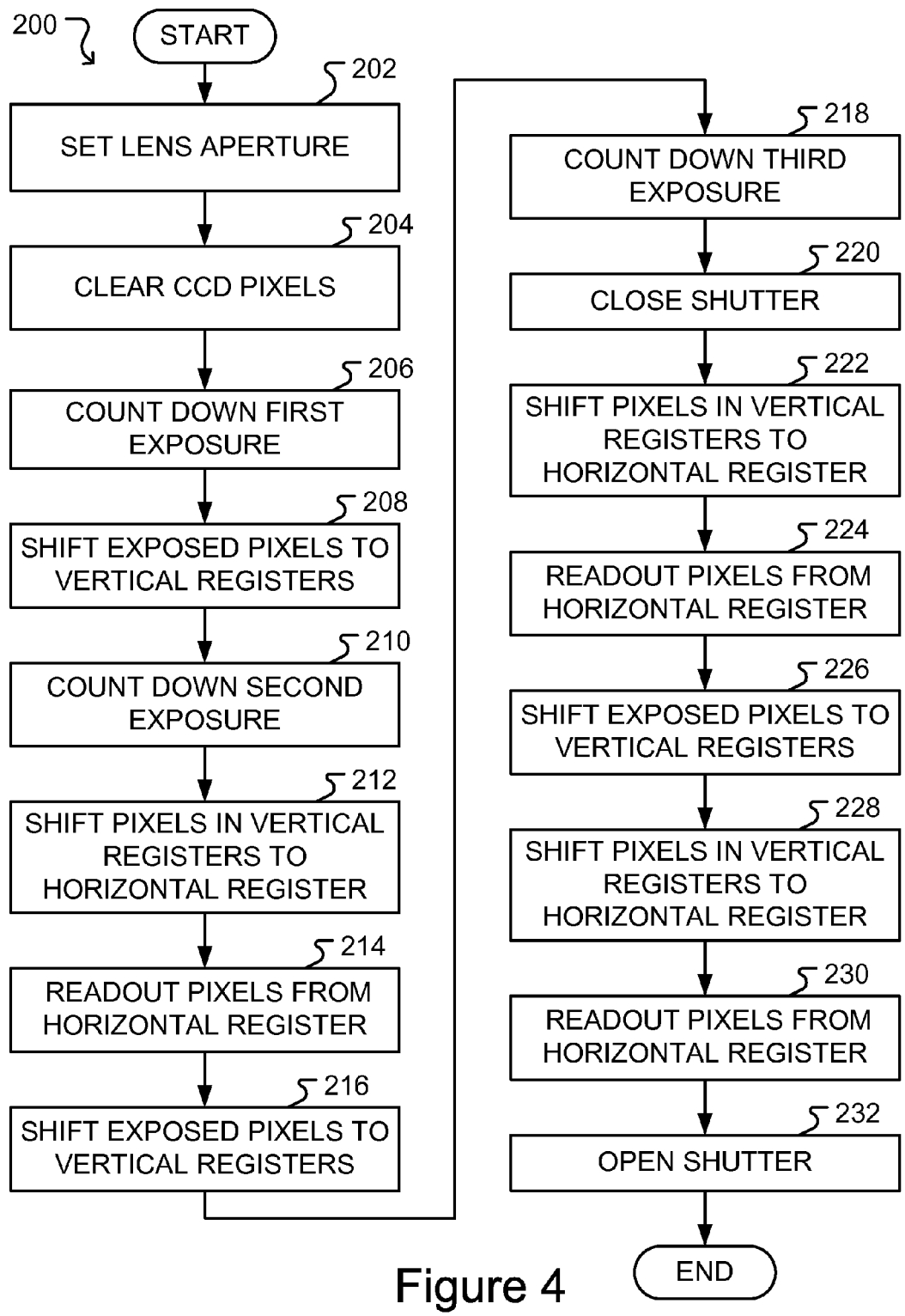
FIG. 4 is a flowchart illustrating the steps in a method according to another embodiment of the invention.

Although two exposures are generally sufficient to produce a HDR image, method 100 described above may be modified to allow the camera to capture more than two exposures. For example, FIG. 4 shows a method 200 which may be used to allow an electronic camera to capture three exposures of a single image during a period while a mechanical shutter remains open. The steps carried out at blocks 202 to 210 of method 200 are the same as those carried out at blocks 102 to 110 of method 100 described above.

During the predetermined time period for the second exposure (block 210), pixel data from the first exposure is shifted down vertical registers 14 to horizontal register 18 at block 212. At block 214 the pixel data from the first exposure is read out from horizontal register 18. Thus, the steps of blocks 212 and 214 may be carried out simultaneously with the step of block 210. At block 216 the charge stored in pixels 16 is shifted into vertical registers 14, thereby ending the second exposure and starting a third exposure.

At block 218 the camera's exposure timer counts down a predetermined time period for the third exposure. After the predetermined time period for the third exposure has elapsed, the mechanical shutter is closed at block 220, thereby ending the third exposure.

At block 222, pixel data from the second exposure is shifted down vertical registers 14 to horizontal register 18. At block 224 the pixel data from the second exposure is read out from horizontal register 18. At block 226, the charge stored in pixels 16 from the third exposure is shifted into vertical registers 14. At block 228, pixel data from the third exposure is shifted down vertical registers 14 to horizontal register 18. At block 230 the pixel data from the third exposure is read out from horizontal register 18. At block 232 method 200 ends. The mechanical shutter may be opened again in or after block 232 to ready the camera for capturing the next image.

Method 200 has the feature that, when used in a camera that incorporates a typical light sensor chip, it requires the readout of some data when the mechanical shutter is open. This can cause some "smearing" of the data being read out, especially in parts of the sensor that are exposed to high levels of illumination. In some embodiments, such smearing is compensated for by comparing image data for the first exposure, which is read out while the mechanical shutter remains open, to image data for the second and/or third exposures, which can be read out after the mechanical shutter has been closed. In other embodiments of the invention, data corresponding to columns from the first exposure that are in shadow, and therefore not too much affected by smearing, are selected and data from those columns is used to gain detail in shadow portions of an HDR image that is obtained by combining image data from the second and third exposures. In other embodiments the image data from the first exposure is used to contribute to the HDR image without compensating for smearing. In some such embodiments, data from the first exposure may be weighted differently in creating the HDR image than data from the second and/or third exposures.

A controller in a camera may be programmed to combine the two or more exposures to yield HDR image data and to store the HDR image data in any suitable HDR format. Where this is done, it can be appreciated that HDR images can be obtained in a way that is essentially transparent to a user.

As will be appreciated by one skilled in the art, methods according to embodiments of the invention can be implemented in electronic cameras by providing the cameras with modified firmware without the need for any new hardware.

Some "high resolution" cameras having CCD chips employ sequential readout techniques when shifting pixel data to the vertical registers. A high resolution camera may have, for example, a resolution of 3 megapixels or more. Some sequential readout techniques involve shifting data from multiple pixels into a single charge storing region of a vertical register over multiple clock cycles. The pixels may be dealt with in portions, with each portion of the pixels comprising one pixel associated with each of the charge storing regions of the vertical registers. The number of portions of pixels is determined by the number of pixels associated with each charge storing region.

Figures 5A, 5B:
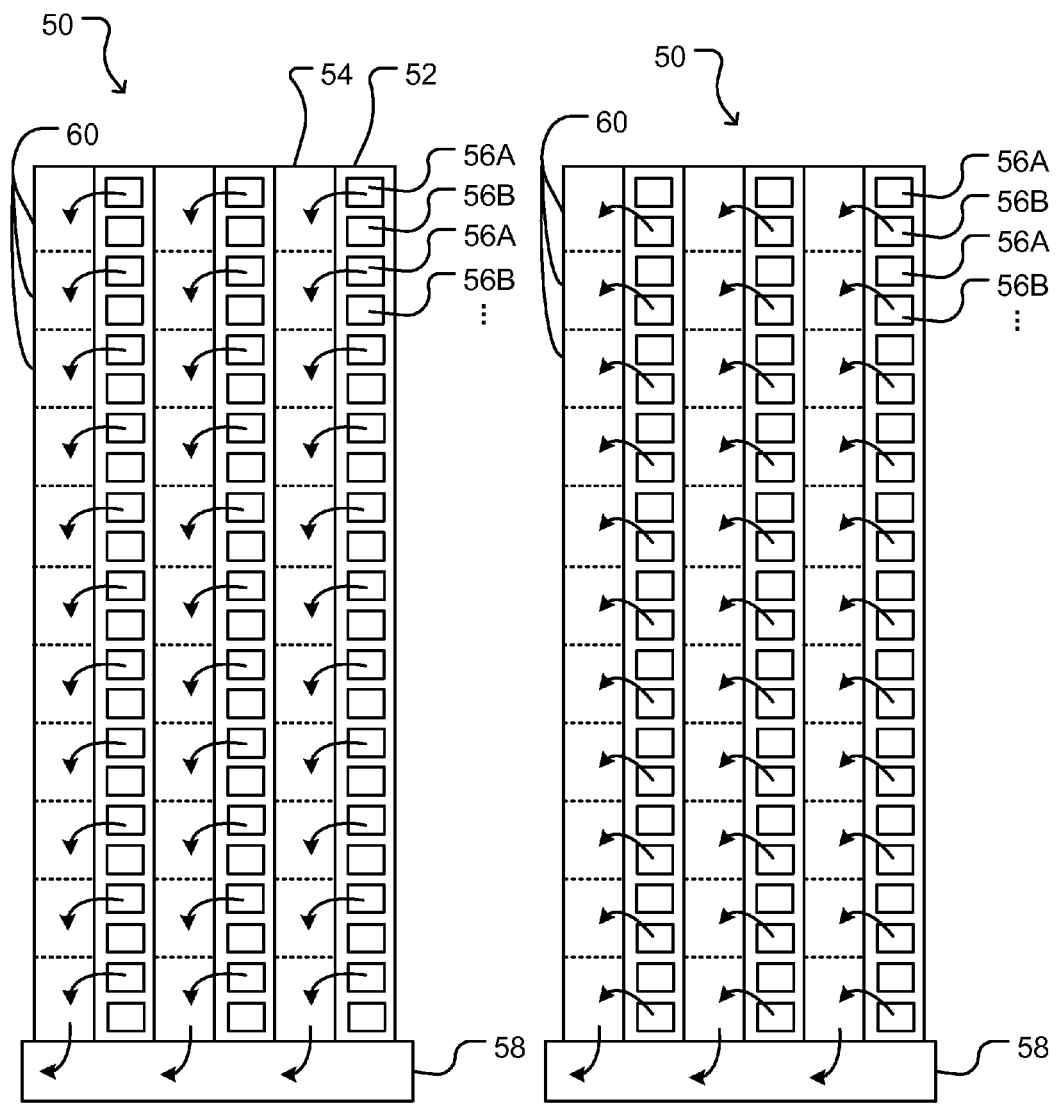
FIGS. 5A and 5B show a high resolution CCD at two different times.

FIGS. 5A and 5B show an example of a CCD 50 of a high resolution camera which employs a sequential readout technique in successive clock cycles. CCD 50 is similar to CCD 10 of FIG. 1, and comprises alternating imaging regions 52 and vertical registers 54. Each imaging region 52 comprises a plurality of pixels 56. Each pixel 56 comprises a sensor that stores an amount of charge determined by the number of photons detected by the sensor. Charge collected by pixels 56 may be shifted to vertical registers 54, then down into a horizontal register 58 for read out.

Each vertical register 54 comprises a plurality of charge storing regions 60 capable of storing charge from pixels 56. In the illustrated example, each charge storing region 60 has two pixels 56A and 56B associated therewith. Pixels 56A collectively comprise a first portion, and pixels 56B collectively comprise a second portion. Charge from pixels 56A of the first portion is simultaneously shifted to vertical registers 54 at a first time, as shown in FIG. 5A. Charge from pixels 56B of the second portion is simultaneously shifted to vertical registers 54 at a second time, as shown in FIG. 5B.

When a camera having a CCD which employs sequential readout techniques is operated to capture a single exposure, pixel data from a first portion of pixels is shifted into the charge storing regions of the vertical registers after the exposure period ends. The pixel data is then read out before pixel data from a next portion of the pixels is shifted into the charge storing regions, and the process repeats until pixel data from all portions of the pixels has been read out. The shutter is typically closed while the pixel data is being read out.

When a camera having a CCD which employs sequential readout techniques is operated to capture multiple exposures according to embodiments of the invention, it may not be desirable to sequentially shift and read out pixel data from the first exposure period for all portions of the pixels. Waiting to read out all portions of the pixel data may delay the start of the second exposure period.

In some embodiments of the invention this problem may be addressed by shifting and reading out pixel data from the first exposure period for only the first portion of the pixels, and interpolating pixel data for the remaining portions of the pixels. It may be desirable for the first exposure period to be longer than the second exposure period in some such embodiments.

In other embodiments of the invention this problem may be addressed by shifting pixel data from all portions of the pixels into the charge storing regions of the vertical registers and reading out combined pixel data from the first exposure period.

In such embodiments, pixel data from each pixel associated with a charge storing region may be approximated or calculated from the charge read out from that charge storing region. For example, if pixel data is combined by summing pixel data from a plurality of pixels to one charge storing region, pixel data for each of the pixels associated with that charge storing region may be determined by dividing the charge read out from each charge storing region by the number of portions of pixels. If pixel data is combined using a different technique, the pixel data may be separated from the charge read out of the common charge storing region using a corresponding technique.

Methods according to example embodiments of the invention are described below with reference to FIGS. 6 and 7. The examples described in FIGS. 6 and 7 contemplate a CCD wherein two pixels are associated with each charge storing region, such that the pixels are divided into two portions, but it is to be understood that methods according to the invention could be practice with any number of portions of pixels.

Figure 6:
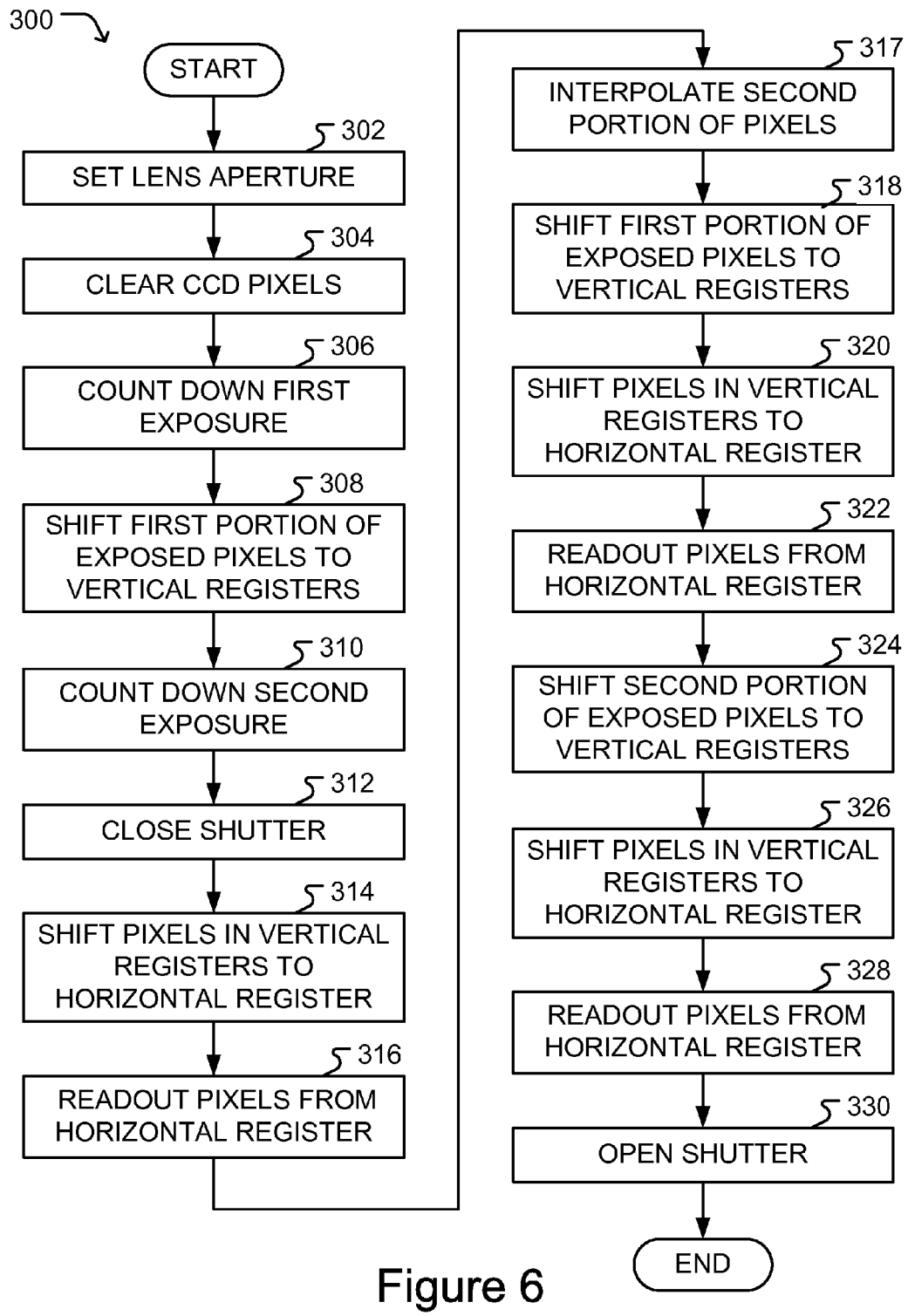
FIG. 6 is a flowchart illustrating the steps in a method according to another embodiment of the invention; and, FIG. 7 is a flowchart illustrating the steps in a method according to another embodiment of the invention.

FIG. 6 shows a method 300 of capturing multiple exposures with a camera having a CCD which employs sequential readout techniques according to one embodiment of the invention. The steps carried out at blocks 302 to 316 of method 300 are similar to those carried out at blocks 102 to 116 of method 100 described above, except that at block 308 only the first portion of pixels from the first exposure are shifted to the vertical registers. At block 317, the second portion of pixels from the first exposure are interpolated based on the readout of the first portion of pixels at block 316. At block 318 the first portion of pixels from the second exposure are shifted to the vertical registers. The first portion of pixels from the second exposure are shifted to the horizontal register at block 320 and read out from the horizontal register at block 322. At block 324 the second portion of pixels from the second exposure are shifted to the vertical registers. The second portion of pixels from the second exposure are shifted to the horizontal register at block 326 and read out from the horizontal register at block 328. At block 330 method 300 ends. In or after block 330, the mechanical shutter may be opened again to ready the camera for capturing the next image.

Figure 7:
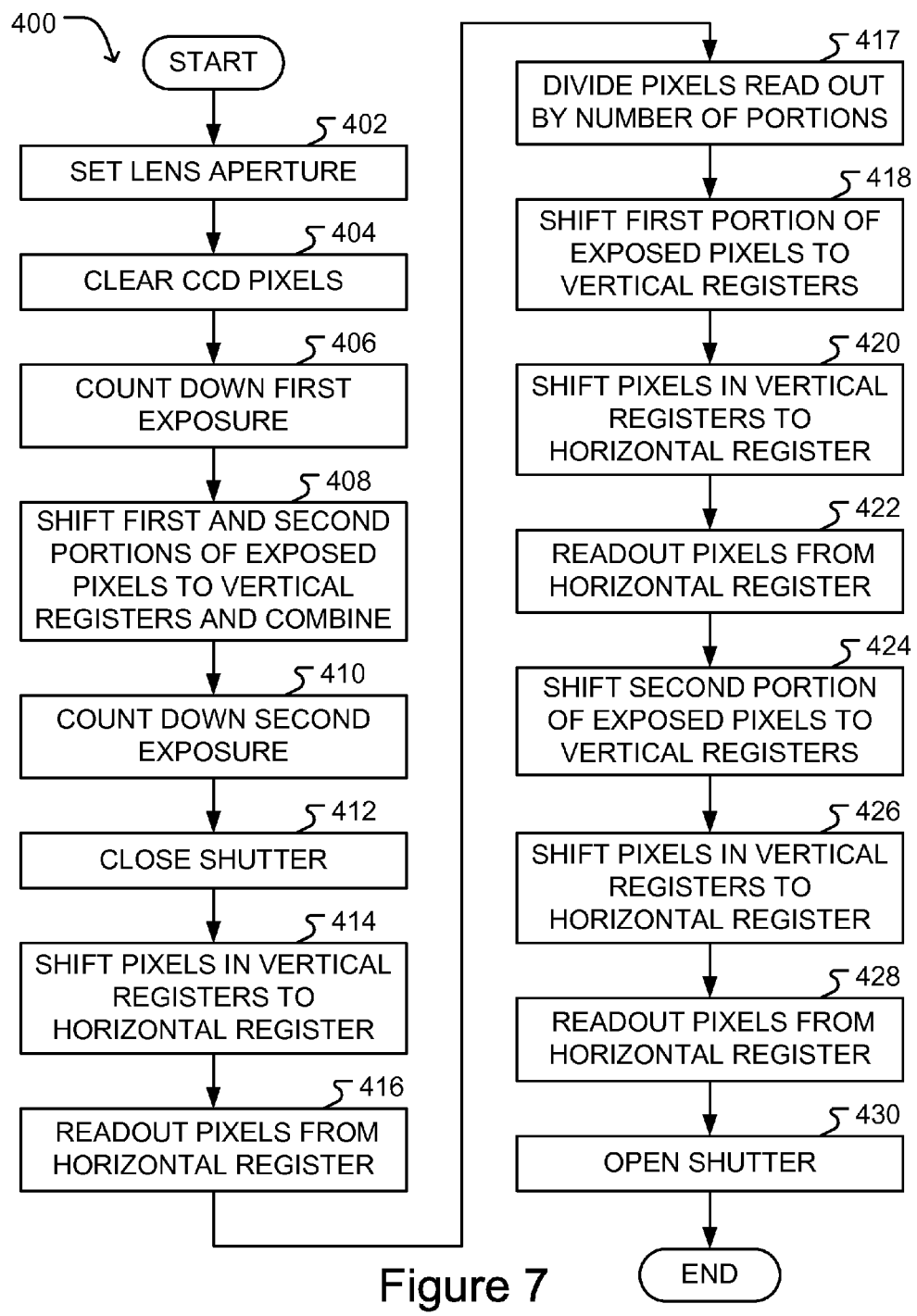

FIG. 7 shows a method 400 of capturing multiple exposures with a camera having a CCD which employs sequential readout techniques according to another embodiment of the invention. The steps carried out at blocks 402 to 430 of method 400 are similar to those carried out at blocks 302 to 330 of method 300 described above, except that at block 408 both the first and second portions of pixels from the first exposure are shifted to the vertical registers and combined, and at block 417 the pixels which are read out from the horizontal register at block 416 are divided by the number of portions of pixels (two in this example) to separate the combined pixels.

Certain implementations of the invention comprise computer processors which execute software instructions which cause the processors to perform a method of the invention. For example, one or more processors in a controller for an electronic camera may implement the methods of FIG. 3, 4, 6 or 7 by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

Any shutter device capable of selectively allowing light to reach or blocking light from reaching a sensor array may be used in place of mechanical shutter 22. The mechanical nature of shutter 22 is optional.

Accordingly, the scope of the invention is to be construed in accordance with the substance defined by the following claims.

What is claimed is:

1. A method of capturing an image with an electronic camera having a shutter for selectively allowing light to reach an image sensor and readout circuitry for selectively reading out pixel data from the image sensor, the method comprising:
    capturing at least three successive exposures of a single image with the image sensor during a period while the shutter remains open, wherein the at least three successive exposures comprise a first exposure, a second exposure starting once the first exposure ends, and a third exposure starting once the second exposure ends;
    reading out data from the at least three successive exposures; and
    combining the data from the at least three exposures to yield high dynamic range image data
    wherein a setting is changed between at least two of the at least three successive exposures.

2. The method according to claim 1 comprising reading out data from the first exposure while capturing another exposure.

3. The method according to claim 2 comprising compensating for smearing of data from the first exposure by comparing pixel data from the first exposure to corresponding pixel data for one or more subsequent exposures.

4. The method according to claim 2 wherein combining the data comprises weighting data from the first exposure differently than data from one or more subsequent exposures.

5. The method according to claim 1 wherein each of the at least three exposures comprise periods of different lengths.

6. The method according to claim 1 wherein the setting is an aperture setting.

7. A program product comprising a non-transitory medium carrying computer-readable instructions which, when executed by a processor in a controller for a camera, cause the controller to control the camera to perform a method according to claim 1.

8. An electronic camera comprising a controller having a processor and a memory storing computer-readable instructions which, when executed by the processor, cause the controller to control the camera to perform a method according to claim 1.

9. An electronic camera comprising:
    an image sensor;
    a shutter for selectively allowing light to reach the image sensor;

readout circuitry for selectively reading out pixel data from the image sensor; and, a controller configured to control the shutter and the readout circuitry, the controller comprising a processor and a memory having computer-readable code embodied therein which, when executed by the processor, causes the controller to:

capture at least three successive exposures of a single image with the image sensor during a period while the shutter remains open, wherein the at least three successive exposures comprise a first exposure, a second exposure starting once the first exposure ends, and a third exposure starting once the second exposure ends;

read out data from the at least three successive exposures; and combine the data from the at least three exposures to yield high dynamic range image data wherein the controller is configured to change a setting between at least two of the at least three successive exposures.

10. The camera according to claim 9 wherein the controller is configured to read out data from the first exposure while capturing another exposure.

11. The camera according to claim 10 wherein the controller is configured to compensate for smearing of data from the first exposure by comparing pixel data from the first exposure to corresponding pixel data for one or more subsequent exposures.

12. The camera according to claim 10 wherein the controller is configured to combine the data by weighting data from the first exposure differently than data from one or more subsequent exposures.

13. The camera according to claim 9 wherein each of the at least three exposures comprise periods of different lengths.

14. The camera according to claim 9 wherein the setting is an aperture setting.

\* \* \* \* \*